Nov. 17, 1970 J. R. RAIRDEN III 3,540,926

NITRIDE INSULATING FILMS DEPOSITED BY REACTIVE EVAPORATION

Filed Oct. 9, 1968

INVENTOR:
JOHN R. RAIRDEN III,
by John J. Kissane
HIS ATTORNEY 3,540,926

NITRIDE INSULATING FILMS DEPOSITED BY REACTIVE EVAPORATION

John R. Rairden III, Niskayuna, N.Y., assignor to General Electric Company, a corporation of New York Filed Oct. 9, 1968, Ser. No. 766,152
Int. Cl. C23c *11/08*; B44d *1/14, 1/18*
U.S. Cl. 117—217 10 Claims

ABSTRACT OF THE DISCLOSURE

Nitride insulating films suitable for utilization both as a capacitor dielectric and an encapsulating material are formed by reactively evaporating a source of aluminum, boron or silicon in an ammonia atmosphere greater than $1\times10^{-5}$ torr and slowly depositing the evaporated source upon a substrate heated above 185° C. Subsequent to the insulating film deposition, ammonia is fed back into the evaporation chamber to produce an ammonia pressure greater than 1 micron wherein the insulating film is heat treated and cooled. To inhibit shorting of the insulating film resulting from a charge build-up of high energy electrons on the insulating film, the deposition of electrodes atop the insulating film is accomplished utilizing filament evaporation.

Figure 1:
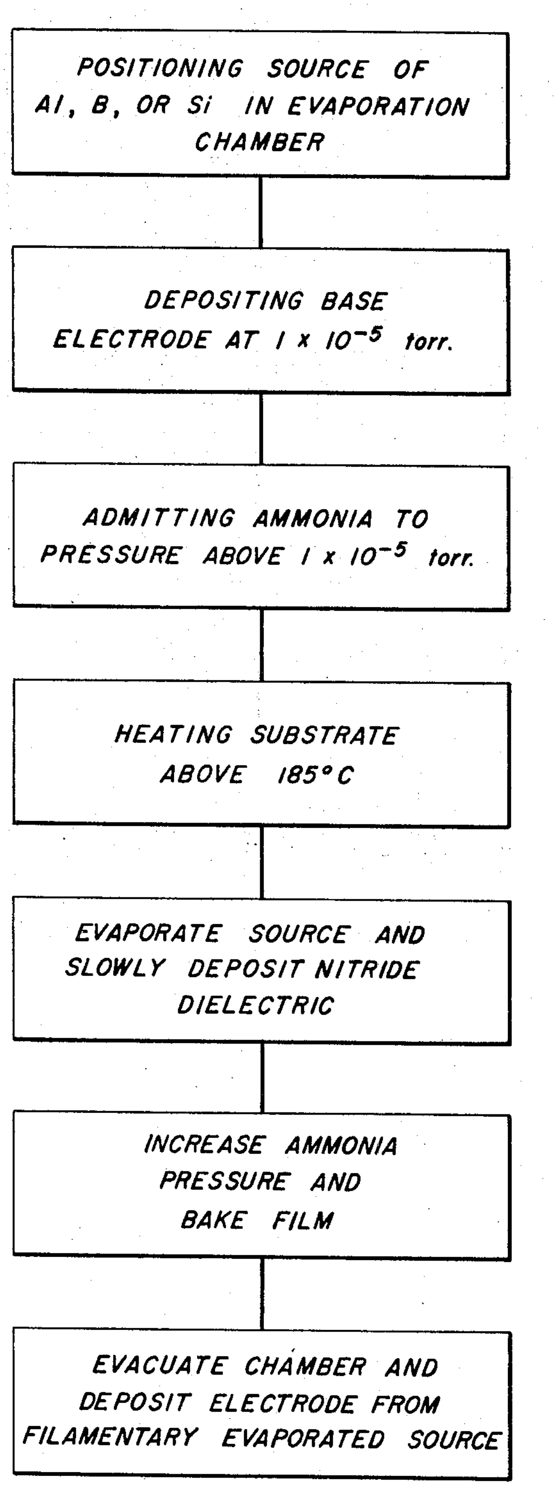

This invention relates to a method of forming nitride insulating films and in particular to the formation of nitride insulating films by reactively evaporating a source selected from the group consisting of aluminum, boron and silicon in an ammonia atmosphere greater than $10^{-5}$ torr.

Nitrides of aluminum, boron and silicon are known to have an extremely high electrical resistivity indicative of the suitability of these nitrides as excellent dielectric materials for active and passive components in integrated circuitry. Because the nitrides are highly refractory, e.g., aluminum nitride has a sublimation temperature of 2400° C., the nitride preparation often cannot be readily controlled and the properties of the product formed are variable dependent upon the purity of the preparation process resulting in a plurality of proposed techniques for forming the insulating nitrides dependent upon the desired utilization of the product. For example, aluminum nitride crystals heretofore have been formed by heating aluminum or aluminum nitride powder in a nitrogen atmosphere at high temperatures to induce crystal growth by a vapor phase reaction or recrystallization, respectively, while aluminum nitride films have been prepared both by the thermal decomposition of aluminum trichloride:ammonia complex, i.e., $AlCl_3:NH_3$, on hot graphite substrates and by chemical transport techniques employing the reaction of aluminum nitride powder and hydrogen halides at temperatures between 800° K. and 1400° K. Thus aluminum nitride films generally have been formed by a two-step process wherein aluminum nitride powder is formed initially and subsequently chemically reacted to form the thin film. Moreover, prior nitride insulating film forming techniques heretofore have required an elevated substrate temperature, e.g., 1000° C. for the chemical transport techniques, restricting the utilization of the insulating film as a coating for temperature sensitive semiconductive devices and substrate materials such as metals and glasses with melting points below 1000° C.

It is therefore an object of this invention to provide a simplified method of directly forming metal nitride insulating films from a metal source.

It is also an object of this invention to provide a low cost method of forming metal nitride insulating films having a low dielectric constant and a low dissipation factor.

It is a further object of this invention to provide a novel method of forming thin film metal nitride dielectric capacitors by vapor deposition.

These and other objects of this invention generally are accomplished by positioning a substrate and a source material selected from the group consisting of aluminum, boron and silicon in an evaporation chamber which chamber is evacuated and filled with sufficient ammonia to produce an ammonia pressure greater than $1\times10^{-5}$ torr within the chamber. The substrate then is heated to a temperature above 185° C. whereupon the source material is vaporized within the ammonia atmosphere and slowly deposited upon the heated substrate, e.g., at a rate less than 200 A. per minute for aluminum nitride depositions, to form the insulating film. Because it is apparently necessary for the vaporized source material to interact with an ammonia molecule within the evaporation chamber prior to deposition, the ammonia pressure within the chamber should be such that the mean-free path of the vaporized source is approximately the source to substrate span with a source to substrate—ammonia pressure arithmetic product in a range from $10^{-3}$ to $10^{-2}$ torr cm. being preferred to achieve the desired interaction of the vaporized source with the ammonia without producing a high porosity in the deposited film.

Figure 2:
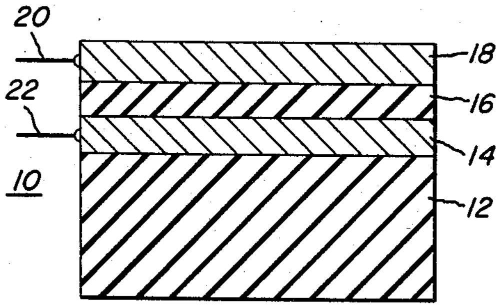
Figure 3:
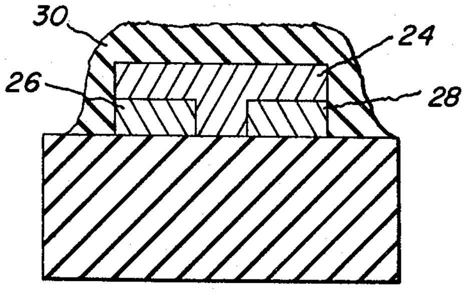

The novel features believed characteristic of the invention are set forth in the appended claims. The invention itself, together with further objects and advantages thereof may best be understood by reference to the following description, taken in connection with the accompanying drawings, in which:

FIG. 1 is a flow chart depicting in block diagram form the method of this invention, FIG. 2 is a sectional view of a thin film capacitor formed by the method of this invention, and FIG. 3 is a pictorial illustration of a semiconductive structure employing the nitride insulating film as an encapsulating agent.

The method of forming insulated thin films in accordance with this invention is depicted in FIG. 1 and generally comprises reactively evaporating a source of aluminum, boron or silicon in an ammonia atmosphere greater than $1\times10^{-5}$ torr and slowly depositing the evaporated source upon a substrate heated to a temperature above 185° C.

In specifically applying the method of this invention to form a dielectric insulator for the thin film capacitor 10 depicted in FIG. 2, a dielectric substrate 12 and a reactive source material selected from the group consisting of aluminum, boron and silicon are positioned within a conventional vacuum deposition chamber such as the transverse electron beam evaporation chamber depicted in my copending U.S. application Ser. No. 675,990, filed Oct. 17, 1967 and assigned to the assignee of the present invention. A counterelectrode metallic source, e.g., gold, silver or aluminum, also is positioned within the deposition chamber with the reactive source material being positioned in a water cooled crucible upon which the electron beam is focused during evaporation while the counterelectrode source is situated within a conventional filament heater, such as is depicted in U.S. Pat. No. 3,320,220, issued June 27, 1967 in the name of C. A. Neugebauer, to inhibit electrical shorts in the deposited capacitor (as will be explained more fully hereinafter).

Dielectric substrate 12 upon which capacitor 10 is formed can be a rigid nonconductive material such as a glass, e.g., soda lime glass, Pyrex, calcium aluminum silicate glass, etc., or a ceramic such as alumina. For continuous processing on a commercial basis however, flexible dielectric materials such as a polyamide, a polyester or an epoxy impregnated laminate generally are preferred for the substrate. Because soda lime glass can tend to become reactive with certain electrode metals and/or nitride dielectrics at the elevated substrate temperatures employed during reactive evaporation of the nitride dielectric in accordance with this invention, a soda free substrate such as Pyrex glass generally is utilized when rigid mechanical supports are desired for capacitor 10. Prior to insertion within the chamber, the substrate is cleaned by any suitable technique such as boiling in detergent solution, rinsing in cold and hot deionized water, rinsing in isopropyl alcohol, and drying in isopropyl alcohol vapors.

In general, aluminum and boron are preferred as the reactive source material for the dielectric layer because of the relatively low dielectric constants and dissipation factors exhibited by films formed of these materials relative to films formed of silicon. Moreover, silicon tends to react with certain conventional electrode metals, such as aluminum and gold, during the reactive deposition requiring the employment of a less reactive metal, such as niobium and tantlum, as the base electrode.

After the insertion of the selected metals and the substrate into the deposition chamber, the chamber is sealed and evacuated to a pressure of less than approximately $1\times10^{-5}$ torr whereupon the selected source material, e.g., an aluminum ingot, is evaporated by the electron beam irradiation and a base electrode 14 is deposited upon substrate 12.

Subsequent to the deposition of the base electrode, the deposition chamber is purged with ammonia whereupon the ammonia pressure is set at a level greater than $1\times10^{-5}$ torr for the reactive evaporation of dielectric layer 16 and the chosen pressure is continuously maintained during deposition in a conventional fashion, e.g., by continuously monitoring the pressure within the chamber utilizing an ionization gauge and feeding back the ionization gauge output signal to a variable leak motor control valve controlling the admission of ammonia into the chamber. Because the method of this invention requires an interaction between the vaporized source molecule and a molecule of the ammonia gas prior to deposition upon the substrate, the ammonia pressure within the deposition chamber desirably should produce a mean-free path approximately equal to the source to substrate distance, e.g., a source to substrate—ammonia deposition pressure arithmetic product of $5\times10^{-3}$ torr cm. Although the upper limit of the pressure range employed in forming insulating films generally is limited primarily by the apparatus utilized for the deposition, e.g., electron beam apparatus tends to be inoperative at pressures in excess of approximately 2 microns, multiple collisions in the gas phase tend to produce a high vacancy density in the deposited dielectric inhibiting use of the dielectric in a capacitor. The source to substrate—ammonia pressure arithmetic product desirably lies in a range from $10^{-3}$–$10^{-2}$ torr cm. for the formation of high quality insulating films.

Employing a 35.5 cm. source to substrate span, a deposition pressure between $1\times10^{-4}$ and $2\times10^{-4}$ torr ammonia has been found to produce a capacitor dielectric having a dissipation factor below 10% and dielectric constant below 10. When different source to substrate distances are employed for deposition, the deposition gas pressure within the chamber is altered to assure a desired number of collisions between the evaporated source and deposition gas to obtain the desired density and dielectric constant in the deposited film. For example, as the mean-free path of the evaporated source molecule is decreased by an increase in the deposition gas pressure, the source to substrate span is decreased to assure a similar interaction between the evaporated source molecules and the ammonia atmosphere prior to deposition upon the substrate. As a practical matter however, source to substrate spans between 125 centimeters and 9 centimeters are required for the vacuum evaporation of dense low dielectric constant films. Elongated source of substrate spans, i.e., greater than 20 cm., however permit a more uniform coating of a larger substrate area and generally are preferred for large scale production.

Prior to the evaporation of the reactive source material in the ammonia atmosphere, the substrate is heated in a conventional manner, e.g., by a heater coil mounted behind the substrate, to produce an average substrate temperature of 185° C. or higher for the deposition of the insulating film thereon. In general, insulating films deposited on substrates below 185° C. tend to be unreacted with the ammonia in the chamber resulting in a conducting film notwithstanding the source to substrate span being in excess of the mean-free path of the evaporated molecule. Similarly the deposition rate employed in forming aluminum nitride insulating films cannot exceed 200 A. per minute without producing a conductivity in the deposited film inhibiting utilization of the film as a capacitor dielectric. The high substrate temperature and low deposition rate required for forming aluminum nitride insulting films in accordance with this invention suggest that a reaction between the electron beam evaporated aluminum and the ammonia in the chamber occurs not only in the gas phase during transit but also upon the surface of the substrate subsequent to deposition thereon. Thus the deposited source molecule is bombarded upon the substrate after deposition by the ammonia in the deposition chamber until overcoated with a subsequently arriving molecule. Should the subsequent arriving molecule land too rapidly, ammonia bombardment of the deposited molecules on the heated substrate surface is inhibited and the film exhibits a relatively high dielectric constant. Although high quality insulating films have been formed in accordance with this invention by depositing a reactively evaporated boron source at a rate as high as 500 A./minute upon a heated substrate, X-ray analysis of these films have not been confirmatory of the presence of the nitride compound because of the amorphous nature of the deposited boron.

While it is required that the substrate be heated above 185° C. to obtain a low dielectric constant in the deposited film, excessive heating of soda-lime glass substrates, e.g., heating above 495° C., tends to increase the dissipation factor in the deposited film beyond a tolerable limit for utilization as a capacitor dielectric. In general, the lowest dielectric constants and dissipation factors were obtained in dielectrics deposited upon a soda-lime glass substrate at a temperature between 310° C. and 370° C. When a less reactive substrate, such as alumina, is employed, the maximum substrate temperature generally is limited only by the softening temperature of the substrate and the chemical reactivity of the substrate with the films deposited thereon.

After the deposition of dielectric 16 to a desired thickness, e.g., less than approximately 10 microns for most thin film capacitors, reactive evaporation is terminated and the chamber is back-filled with ammonia to raise the ammonia pressure within the chamber above 1 micron. The dielectric coated substrate is maintained at the deposition temperature for 15 minutes in the back-filled ammonia atmosphere whereupon heating of the substrate is terminated and the substrate is cooled in the ammonia atmosphere to a temperature less than 125° C. By cooling the deposited dielectric in the generally high pressure of the back-filled chamber, deterioration of the film associated with high vacuum cooling is inhibited.

Subsequent to the cooling of the film in the ammonia atmosphere, the evaporation chamber again is exhausted and the filament heater is energized to vaporize the metallic source therein to deposit counterelectrode 18 atop electron beam deposited dielectric layer 16. By employing the filament heater rather than an electron beam to vaporize the counterelectrode metallic source, a charge build-up of high energy electrons on dielectric layer 16 is inhibited thereby reducing the tendency of the dielectric layer to arc-discharge.

Typically capacitor 10 is of a dimension suitable for thin film circuitry with electrodes 14 and 18 being of a thickness between 400 A. and 10 microns while dielectric layer 16 characteristically also has a thickness between 400 A. and 10 microns.

Because silicon has a tendency to react with an aluminum base electrode when deposited in the ammonia environment of the deposition chamber, when silicon is utilized as the reactive source material the base electrode of the insulating film desirably is formed of a metal nonreactive with silicon, such as niobium or tantalum. For example, in fabricating a capacitor having a silicon nitride dielectric, niobium or tantalum is positioned within the filament heater and silicon is placed within the water cooled crucible at the focal point of the electron beam. The niobium then is vaporized in a vacuum less than $10^{-5}$ torr by energization of the filament heater and the base electrode is deposited upon a dielectric substrate, e.g., a flexible polyamide layer, whereupon the niobium coated substrate is heated to a temperature above 185° C. and ammonia is admitted to the chamber to produce an ammonia pressure greater than $1\times10^{-5}$ torr. The silicon then is evaporated using the electron beam gun and a silicon nitride dielectric layer 16 is deposited atop the niobium base electrode at a rate less than 200 A. per minute. Subsequent to the electron beam deposition of the dielectric, the structure is annealed at the deposition temperature and cooled in an ammonia atmosphere greater than 1 micron whereupon the chamber is again exhausted and a metallic counterelectrode 18 is vacuum deposited atop the dielectric layer by energization of the filament heater.

After the deposition of the capacitor, conductive leads 20 and 22 can be affixed to the capacitor electrodes in a conventional fashion, e.g., by thermo compression or the utilization of a suitable solder. If a reduced dissipation in the capacitor is desired, the capacitor can be reinserted in the deposition chamber and coated with a nitride of aluminum, boron or silicon employing the techniques utilized during the deposition of dielectric layer 16, e.g., electron beam evaporation of aluminum in an ammonia atmosphere greater than $10^{-5}$ torr and depositing the coating upon a heated capacitor at a rate less than 200 A./minute.

When it is desired to employ the insulating film of this invention as an encapsulant, a suitable structure such as a semiconductive wafer 24 of, for example, cadmium sulfide deposited atop gold source and drain electrodes 26 and 28 respectively, is positioned within the deposition chamber along with the reactive source material of aluminum, boron or silicon to be employed in forming the encapsulant. Ammonia then is admitted to the chamber to produce an ammonia pressure in excess of $1\times10^{-5}$ torr and the semiconductor is heated to a temperature in excess of 185° C. whereupon evaporation of the source metal by the electron beam is initiated. After depositing an encapsulating layer 30 to a desired thickness upon the semiconductive wafer, evaporation of the source metal is terminated and the system is back-filled with ammonia to produce a pressure in excess of 1 micron with the substrate being maintained at the deposition temperature in the back-filled ammonia atmosphere for approximately 15 minutes. The wafer then is allowed to cool in the back-filled ammonia atmosphere to form the encapsulated structure depicted in FIG. 4. Encapsulating layers reactively formed by the method of this invention also can be advantageously employed in coating thin film resistors, e.g., tungsten carbide resistors formed by techniques disclosed in my copending application Ser. No. 675,990, filed Oct. 17, 1967. Because aluminum nitride exhibits a high thermal conductivity, aluminum nitride encapsulants formed by the method of this invention afford not only electrically insulating coatings for the encapsulated structure but also assist in dissipating heat generated by electron flow in the underlying structure.

A more complete understanding of the principles of this invention may be understood from the following illustrative examples directed to the formation of thin film capacitors.

EXAMPLE 1

A soda-lime glass 1 x 3-inch microscopic slide substrate was cleaned, i.e., by boiling in detergent solution, rinsing in cold then hot deionized water, rinsing in isopropyl alcohol and drying in alcohol vapors, and positioned within a 10 kilowatt transverse electron beam gun deposition chamber at a location 35.5 centimeters from an aluminum ingot source situated at the focal point of the electron beam. A gold counterelectrode source then was positioned within a filament heating coil situated in the deposition chamber and the chamber was evacuated through a liquid nitrogen trap to a pressure less than $1\times10^{-5}$ torr employing a 6-inch oil diffusion pump. After positioning a stencil mask atop the soda-lime glass substrate, the aluminum ingot within the water cooled crucible was evaporated employing a deposition power of 6 kilovolts and 860 milliamps to form two aluminum film strips 5 millimeters wide along the length of the substrate. The stencil then was removed from atop the substrate and the chamber purged with ammonia for 5 minutes. After purging, the ammonia pressure within the chamber was fixed at $1\times10^{-4}$ torr and the substrate heated to approximately 340° C. whereupon electron beam evaporation of the aluminum ingot at 6 kilovolts and 860 milliamps again was initiated. Evaporation of the source continued for 15 minutes and a 750 A. thick aluminum nitride dielectric layer was deposited at a rate of approximately 50 A./minute upon the aluminum strip coated substrate. Electron beam evaporation of the ingot then was terminated and the deposition chamber backfilled with ammonia to a pressure greater than 1 micron in which atmosphere the coated substrate was baked for 15 minutes at 340° C. Heating of the substrate then was terminated and the sample allowed to cool in the backfilled ammonia atmosphere to a temperature less than 125° C. whereupon the chamber was evacuated to a pressure below $1\times10^{-5}$ torr and the filament heating coil was energized to evaporate the gold source which was deposited as a counterelectrode atop the aluminum nitride dielectric layer. Subsequent measurement of the capacitance of the deposited dielectric employing a commercially available bridge and an applied interelectric signal of ½ volt at 1 kilocycle indicated the dielectric layer to have a dielectric constant of approximately 9.3 and a dissipation factor of approximately 12%.

EXAMPLE 2

A substrate cleaned in the manner of the previous example was placed in a deposition chamber at a 35.5 centimeter span from a boron source positioned in a water cooled crucible at the focal point of a transverse electron beam gun and an aluminum source was placed within a filament heating coil within the deposition chamber. The chamber then was evacuated to $1\times10^{-5}$ torr whereupon the aluminum source within the filament heating coil was vaporized and deposited atop the substrate through a stencil to form two 5-millimeter wide aluminum strip base electrodes for the capacitor. After purging the chamber with ammonia, the chamber was sealed and sufficient ammonia admitted to produce an ammonia pressure of $8\times10^{-4}$ torr within the chamber. The aluminum strip coated substrate then was heated to 185° C. and deposition of the boron source in the ammonia atmosphere was initiated using a 5-kilovolt, 600-milliamp electron beam. Deposition of the boron was continued for 20 minutes at a rate of approximately 475 A. per minute to form a 9500 A. thick boron nitride dielectric layer whereupon evaporation of the boron was terminated and ammonia admitted to the chamber to raise the ammonia pressure to approximately 0.1 torr. Heating of the substrate at 185° C. was continued for 15 minutes whereupon the substrate was cooled below 125° C. and ammonia was exhausted from the chamber. After evacuating the chamber to a pressure below $1\times10^{-5}$ torr, the filament heating coil again was energized and an aluminum counterelectrode deposited atop the boron nitride dielectric. Subsequent measurement of the boron nitride dielectric characteristics with a commercial bridge and an applied interelectrode signal of ½-volt at 1 kilocycle indicated the capacitor to have a dielectric constant of 7.0 and a dissipation factor between 3 and 8%.

EXAMPLE 3

A 300 A. film was formed by electron beam evaporating an aluminum source in an atmosphere of $8\times10^{-4}$ torr nitrogen and depositing the film at a rate of 50 A. per minute atop a metallic electrode upon a cleaned glass substrate positioned 35.5 centimeters from the aluminum source. The electron beam power employed during the film deposition was 8.5 kilovolt and 500 milliamp and the substrate was heated to an average temperature of 460° C. during deposition. Subsequent measurement of the deposited film indicated the film to be highly conductive and unsuitable as a capacitor dielectric.

What I claim as new and desire to secure by Letters Patent of the United States is:

1. A method of forming insulating films comprising positioning a substrate and a source material selected from the group consisting of aluminum, boron and silicon in an evaporation chamber, evacuating said chamber and admitting ammonia into said chamber to produce an ammonia pressure greater than $1\times10^{-5}$ torr within said chamber, heating said substrate to a temperature above 185° C., vaporizing said source material within the ammonia atmosphere of said chamber and depositing said evaporated material upon said substrate to form a nitride insulating film.

2. A method of forming insulating films according to claim 1 including baking said deposited insulating film at a temperature above 185° C. in an ammonia atmosphere greater than one micron.

3. A method of forming insulating films according to claim 2 wherein said source material is aluminum and said deposition is conducted at a rate less than 200 A./minute.

4. A method of forming an insulating film according to claim 1 wherein said substrate is a dielectric having a metallic film deposited thereon and said source material is vaporized by electron beam evaporation.

5. A method of forming a thin film capacitor comprising forming an insulating film according to claim 4, filament evaporating a metallic source and depositing a counterelectrode atop said insulating film.

6. A method of forming a thin film capacitor according to claim 5 wherein said source material is aluminum, said dielectric is a flexible substrate of a material selected from the group consisting of a polyamide, a polyester and an epoxy impregnated laminate and said deposition is conducted at a rate less than 200 A./minute.

7. A method of forming an insulating film according to claim 4 wherein said dielectric substrate is coated with a niobium film and said source material is silicon.

8. A method of forming a capacitor according to claim 5 including attaching contact leads to said metal film layers and depositing an encapsulating layer atop said capacitor by the reactive evaporation of said source material in an ammonia atmosphere greater than $1\times10^{-5}$ torr.

9. A method of forming an insulating film comprising positioning a substrate and a source material selected from the group consisting of aluminum, boron and silicon in an evaporation chamber, evacuating said chamber and admitting ammonia into said chamber to produce a source to substrate-ammonia pressure arithmetic product in a range from $1\times10^{-3}$ torr cm. to $1\times10^{-2}$ torr cm., heating said substrate to a temperature above 185° C., evaporating said source material within the ammonia atmosphere of said chamber and slowly depositing said evaporated source material upon said substrate to form said insulating film.

10. A method of forming an insulating film according to claim 9 wherein said substrate is heated between 185° C. and 495° C., the ammonia pressure in said chamber is between $1\times10^{-4}$ torr and $2\times10^{-4}$ torr, said source material is aluminum and said deposition is conducted at a rate less than 200 A. per minute.

References Cited

UNITED STATES PATENTS

| | | | |
|---|---|---|---|
| 3,095,527 | 6/1963 | Barnes et al. | |
| 3,368,919 | 2/1968 | Casale et al. | 117—217 |
| 3,413,090 | 11/1968 | Krock et al. | 117—106 X |
| 3,419,761 | 12/1968 | Pennebaker | 317—234 |
| 3,429,020 | 2/1969 | Diefendorf | 29—25.42 |
| 3,449,092 | 6/1969 | Hammond | 117—107 X |
| 3,492,153 | 1/1970 | Ervin | 117—106 |

ALFRED L. LEAVITT, Primary Examiner

C. K. WEIFFENBACH, Assistant Examiner

U.S. Cl. X.R.

29—25.42; 117—62, 119.6, 106, 201, 227; 317—258